United States Patent [19]

Yotsutsuji et al.

[11] 4,285,901
[45] Aug. 25, 1981

[54] METHOD OF MAKING AN INSULATED METAL MOLD

[76] Inventors: Akira Yotsutsuji, 462-37, 6-chome, Isokabe, Kashiba-cho, Kitakatsuragi-gun, Nara-ken; Seiichi Ueda, 20-2, Daianji, Tawaramoto-cho, Shiki-gun, Nara-ken; Hiroyuki Iwami, 29-20, Nagisahigashi-machi, Hirakata-shi, Osaka-fu, all of Japan

[21] Appl. No.: 52,824

[22] Filed: Jun. 27, 1979

Related U.S. Application Data

[62] Division of Ser. No. 922,310, Jul. 6, 1978, Pat. No. 4,225,109.

[51] Int. Cl.³ .................................................. B29C 1/02
[52] U.S. Cl. ...................................... 264/225; 156/242; 264/220; 264/221; 264/226; 264/261; 264/537
[58] Field of Search ................ 264/219, 220, 221, 225, 264/337, 261, 226, 227; 156/242, 245

[56] References Cited

U.S. PATENT DOCUMENTS

| 2,250,246 | 7/1941 | Axline et al. | 264/225 |
| 3,249,672 | 5/1966 | Richards et al. | 264/227 |
| 3,405,212 | 10/1968 | Fraser et al. | 264/221 |
| 3,424,635 | 1/1969 | Grandinetti et al. | 264/220 |
| 3,723,584 | 3/1973 | Nussbaum | 264/337 |
| 3,784,451 | 1/1974 | Garner | 264/225 |
| 4,044,449 | 8/1977 | Phan | 264/261 |
| 4,075,304 | 2/1978 | Watson | 264/261 |

*Primary Examiner*—James B. Lowe
*Attorney, Agent, or Firm*—Keil & Witherspoon

[57] ABSTRACT

An element having a molding surface defining the cavity of a mold for molding thermoplastic resin and a method of making the element. To regulate the cooling speed of the molten resin to be injected or placed into the cavity, the molding surface is provided by a thin metal layer and a layer of heat insulating material is formed on the inner side of the metal layer.

17 Claims, 4 Drawing Figures

METHOD OF MAKING AN INSULATED METAL MOLD

This is a division of application Ser. No. 922,310, filed July 6, 1978, now U.S. Pat. No. 4,225,109.

This invention relates to an element having a molding surface defining the cavity of a mold for molding thermoplastic resin particularly by injection molding or blow molding and to a method of making the element.

Molds for the injection molding of thermoplastic resin are usually made from metal material such as iron, steel, stainless steel, aluminum alloy or brass. Such metal material has good thermal conductivity and is therefore advantageous in allowing the melt of thermoplastic resin in the mold to cool rapidly to greatly shorten the molding cycle.

However, because the molten resin cools at an exceedingly high speed due to the outstanding heat conducting properties of the metal mold, the molten resin, when injected into the mold cavity, instantaneously solidifies over the melt surface brought into contact with the mold surface, thus forming a thin solid layer.

During the process of injection of molten resin into the cavity, the molten resin tends to flow at nonuniform velocity and/or in turbulence causing the thin solid layer to form with surface irregularity, which consequently results in defective appearance of the molded article like flow marks.

Also, the solidified layer in the vicinity of the gate gradually thickens, thus making the resin flow passage the smaller and, as a result, causing an outstanding drop in internal pressure of the cavity.

To compensate for the drop of the internal pressure, the injection pressure should be increased. However, increase of injection pressure requires a corresponding increase of mold clamping pressure. And the increase of injection pressure and of mold clamping pressure involves higher equipment cost. In an attempt to preclude flow marks and ensure perfect transfer of the molding surface onto the resin, increased injection pressure may be usable to keep the internal pressure of the cavity at a higher level after the filling of the cavity, but since the above-mentioned solid layer has already been formed when the cavity is filled up, the increased pressure would be unable to act effectively in offsetting the flow marks for perfect transfer of the molding surface. The initially solidified layer formed on the surface of the resulting molded article impairs its appearance.

Moreover nonuniform shearing stress will develop between the solid layer and flowing resin layer. The stress will then remain in the molded article as residual stress, producing a warp, crack or crazing in the article.

In order to eliminate impaired appearance and residual stress, usual practice is to maintain the mold at the highest possible temperature to slow down the cooling of the melt so that the solid layer may have the smallest possible thickness, and/or to adjust the velocity at which the molten resin is fed to the cavity.

Insofar as conventional metal molds are used, however, it is impossible to fundamentally overcome the drawbacks described above no matter what molding conditions may be used because of the exceedingly high thermal conductivity of metal materials. Even if the mold temperature is raised to a level close to the second order transition point of the material, the rise of the temperature would not be substantially effective in regulating the cooling speed of the molten resin. Thus the problems described above still remain to be remedied.

In the blow molding of thermoplastic resin, compressed air is blown into a parison of molten resin placed in a divided metal mold, inflating the parison into contact with the metal mold, which cools the molten resin to give a molded article. As is the case with the injection molding described above, the blow molding process involves the problems of imperfect transfer of the molding surface onto the resin due to the formation of solid resin layer. Additionally, since the compressed air used for blow molding is generally low, greater difficulties are encountered in producing flawless molded articles of good appearance.

Accordingly we have carried out extensive research on molding elements (cavity element and core element for injection molding, and divided molding elements for blow molding) having a molding surface defining a mold cavity in an attempt to substantially remedy the foregoing drawbacks by regulating the thermal conductivity of at least one of the molding elements.

In the initial stage of our research, we conducted molding experiments with use of elements having a heat insulating layer of thermosetting resin providing a molding surface. The experiments revealed that the thermosetting resin layer, although effective for heat insulation, had very poor hardness and was unserviceable as the molding surface layer of the mold and that the layer, when exposed to the hot molten resin, was softened or damaged.

Subsequently we conducted experiments with use of elements whose molding surface was provided by a thin metal layer, with a layer of heat insulating material formed on the inner side of the metal layer. The elements were satisfactorily usable free of any trouble. In fact, we have found that the problems heretofore encountered can be almost completely overcome with use of the elements and that those for injection molding give molded articles of wall exceedingly thinner than heretofore possible. In the course of the research described above, we have also developed a method of making desirable elements. Thus this invention has been accomplished.

An object of this invention is to provide an improved element having a molding surface defining the cavity of a mold for molding thermoplastic resin. According to the present invention, said element comprises a thin metal layer providing the molding surface and a layer of heat insulating material formed on the inner side of the metal layer, so that the molten resin to be injected or placed into the cavity will be allowed to cool at a regulated speed, the thin metal layer and the heat insulating layer enabling the metal layer to be heated by the heat of the molten resin immediately when the resin is injected or placed into the cavity to inhibit, to the greatest possible extent, the formation of the solid resin layer that would otherwise occur upon the injection or placement of the molten resin into the cavity, the element thus being adapted to ensure improved transfer of the molding surface onto the resin, to preclude or minimize the formation of weld marks and flow marks, to permit the resulting product to have uniform and reduced residual stress, to perform the molding operation with reduced injection or blow pressure and to have an ability to produce articles of thin wall in the case of injection molding.

Another object of this invention is to provide a method of making the element described above. According to this invention, said method comprises the steps of preparing a master mold conforming to the shape of a specified portion of the desired article to be molded, forming a thin metal layer over the master mold in conformity with the shape of the master mold, forming a layer of heat insulating material over the thin metal layer, forming a backing layer over the heat insulating layer and removing the master mold from the thin metal layer after forming the backing layer.

Still another object of the invention is to provide another method of making the element. According to this invention, the method comprises the steps of preparing a master mold conforming to the shape of a specified portion of the desired article to be molded, forming a thin metal layer over the master mold in conformity with the shape of the master mold, preparing a backing member fittable to the thin metal layer with a clearance provided between the metal layer and the backing member for forming a layer of heat insulating material, forming the heat insulating layer between the metal layer and the backing member spaced apart therefrom by the clearance and thereby joining the backing member to the metal layer and removing the master mold from the metal layer after joining the backing member to the metal layer.

These and other objects, features and advantages of this invention will become more apparent from the following description with reference to the accompanying drawings where necessary. In the drawings.

Figure 1:
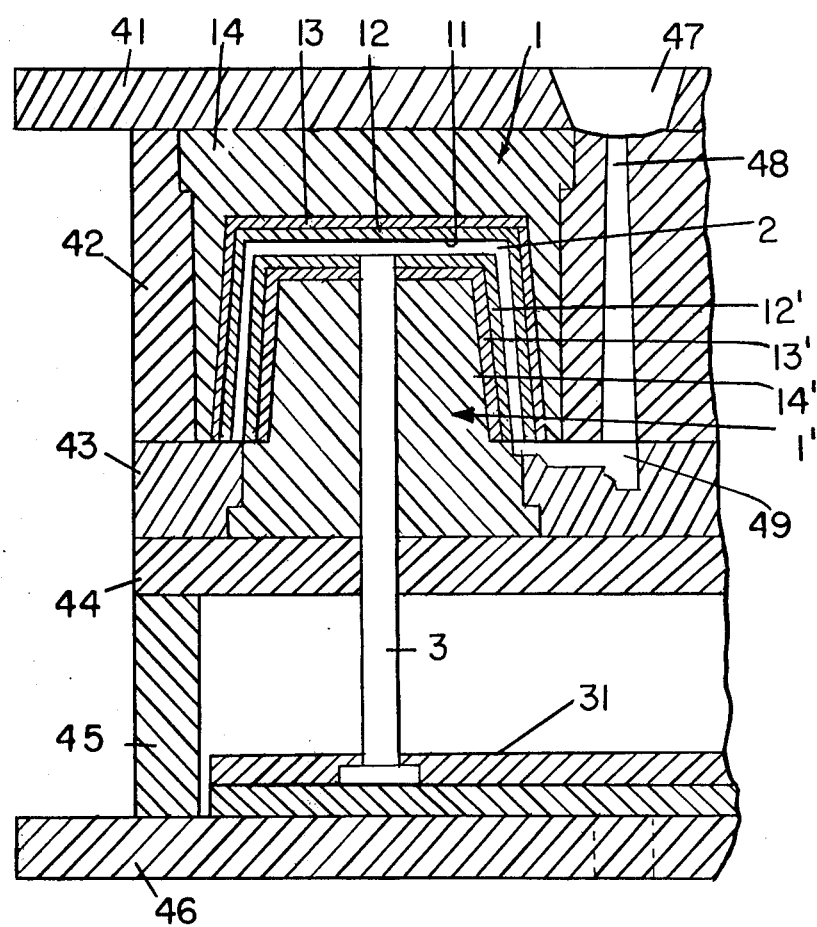
FIG. 1 is a fragmentary sectional view schematically showing a mold for the injection molding of thermoplastic resin including elements (cavity element and core element) according to this invention.

With reference to FIG. 1, a cavity element 1 for injection molding, an embodiment of this invention, will be described first.

The element 1 has a molding surface 11 defining the cavity 2 of the mold and provided by a thin metal layer 12. Preferably the metal layer 12 has a thickness of 0.001 mm to 3 mm to impart suitable strength and durability to the molding surface 11 and to be heatable immediately when molten resin is charged into the cavity 2 so that the solid layer which is usually formed will not occur.

The thin metal layer can be formed from at least one of various metals such as zinc, zinc alloys, nickel, nickel alloys, chromium, copper, copper alloys (beryllium-copper, brass, bronze, etc.), aluminum, aluminum alloys, etc.

A layer of heat insulating material 13 is provided on the inner side of the metal layer 12. The heat insulating layer 13 serves to permit the molten resin to immediately heat the metal layer to the desired temperature by preventing the release of the heat from the metal layer. Of course, the heat insulating layer 13 should not be such that it will undesirably hinder the cooling of the resin after the cavity 2 has been filled up.

The kind and thickness of the insulating layer 13 are to be determined in view of the desired control of heat conduction, strength and durability. Various materials are usable for the heat insulating layer 13 such as thermosetting resin compositions incorporating a hardener or curing agent. In fact, it is most convenient and effective to use thermosetting resin compositions comprising a thermosetting resin, a hardener or curing agent and at least one of inorganic filler, metal powder filler and fibrous filler. Examples of useful inorganic fillers are powders of inorganic materials such as glass, silica, calcium carbonate, talc, clay, alumina and a mixture containing at least two of these materials. Examples of useful metal powder fillers are powders of metals such as aluminum, aluminum alloys, copper, copper alloys (e.g. brass) and a mixture containing at least two of these metals. Examples of useful fibrous fillers are fibrous materials such as glass fiber, carbon fiber, asbestos fiber, whisker and a mixture containing at least two of these materials. Examples of useful thermosetting resins are epoxy resin, diallyl phthalate resin, polyester resin, phenolic resin and modified products of these resins. When adhesive properties are required. epoxy resin or modified epoxy resin is suitable to use.

The heat insulating layer 13 is reinforced by a backing layer or member 14 which can be made from any of various metal materials which will afford the desired reinforcement.

FIG. 1 shows a core element 1', another embodiment of the present invention. The core element 1' comprises a thin metal layer 12', a heat insulating layer 13' and a backing layer or member 14' which are made from the same materials as in the element 1. The core element 1' has a bore through which an ejector pin 3 extrudes.

Although both molding elements shown in FIG. 1 are each provided with a thin metal layer and a heat insulating layer, it will be readily understood that either one of the elements alone will be so constructed as contemplated by this invention, depending on the type of the article to be molded. For example, when the contour of the desired product is to be formed by a cavity element, the cavity element alone can be made according to this invention for use with a core element of the conventional type.

FIG. 1 further shows an ejector plate 31, a stationary mounting plate 41, a stationary mold plate 42, a movable mold plate 43, a support plate 44, a spacer block 45, a movable mounting plate 46, a nozzle fitting portion 47, a sprue 48 and a runner 49.

The divided mold elements for blow molding may have the same construction as the injection molding elements described above.

According to the method of this invention, a master mold is prepared first, and a thin metal layer is formed over the master mold in conformity with the shape of the master mold. Subsequently, (1) a layer of heat insulating material is formed over the metal layer, and a backing layer is further formed over the heat insulating layer, or (2) the heat insulating layer is formed between the thin metal layer and a backing member fitting to the metal layer with a specified clearance provided therebetween, with the metal layer and the backing member joined together by the insulating layer.

The thin metal layer can be formed by various methods, for example, by electroforming, metal spraying or electroless plating. In view of accuracy and workability, electroforming method may preferably be resorted to.

When the metal spraying method is used, the desired metal layer can be formed by spraying at least one of metals such as zinc, zinc alloy, nickel, nickel alloy, chromium, copper, copper alloy (beryllium-copper, brass, bronze, etc.), aluminum or aluminum alloy onto a master mold made from plastics, wood, wax, gypsum, metal or the like.

When the electroforming method is used, the master mold must have an electrically conductive surface. Accordingly if the master mold is made of nonconductive material, the master mold needs to be coated with graphite or metal powder or treated by chemical plating, silver mirror reaction, vacuum evaporation, spattering, ion plating or the like to render the master mold surface conductive before the metal layer is formed thereon.

Whatever method may be used, the master mold is eventually removed from the thin metal layer, for example, by withdrawing the master mold from the layer, by tearing the master mold, by dissolving the master mold or by melting the master mold. For the withdrawal of the master mold, it is preferable to provide release treatment for the master mold prior to the formation of the metal layer. The master mold is rendered releasable in different ways depending on the material of the master mold and in the case of metal material by forming a release film by silver mirror reaction, vacuum evaporation or chemical treatment for forming an oxidation film. The master mold, when nonconductive, can be made conductive and releasable at the same time by silver mirror reaction or vacuum evaporation.

When the heat insulating layer is formed directly on the thin metal layer, a heat insulating material, for example the thermosetting resin composition mentioned before, is applied to the metal layer as by coating. When desired, the resulting assembly is machined to the specified dimensions and shape for finishing.

When the heat insulating layer is to be formed between the thin metal layer and a backing member separately prepared, the heat insulating layer can be formed (1) by fitting the backing member to the metal layer as spaced therefrom by a specified clearance, and then filling the clearance with a heat insulating material, such as the aforementioned thermosetting resin composition, in a flowable state, or (2) placing into the clearance between the metal layer and the backing member a heat insulating material, such as the aforesaid thermosetting resin composition, which is curable with application of heat and pressure to a uniform layer, and curing the material by heating the material through the metal layer and the backing member under pressure, or (3) covering the metal layer with a heat insulating material and adhering the insulating material to the backing member with an adhesive such as an epoxy resin adhesive. The adhesive, when used, forms part of the heat insulating layer.

The backing layer can be formed by electroforming, metal spraying or metal casting. When the heat insulating layer is considerably rough-surfaced, the electroforming method is suitable to use in view of reliability and accuracy, in which case the surface of the insulating layer is rendered electrically conductive as desired. When the heat insulating layer is substantially smooth-surfaced and also when it is desired to form the backing layer within a short period of time, the metal spraying method or metal casting method is preferable. In accordance with the material of the heat insulating layer, a suitable alloy of low melting point is used for metal casting. The backing member obtained is machined to the specified dimensions and shape when necessary to obtain the desired finished backing layer.

When a backing member separately made is to be used in place of the backing layer, the backing member can be easily formed from iron or steel material by machining.

The method of this invention will be described below with reference to examples in which injection molding cavity elements are prepared for illustrative purposes. In these examples, the master mold is finally removed from the thin metal layer.

EXAMPLE 1

A master mold is made from brass by machining, in conformity with the shape of the desired portion of the article to be molded. The master mold is subjected to release facilitating treatment as follows. The master mold is rendered releasable by being subjected to the successive steps of degreasing with a weakly alkaline solution, washing with water, immersion in 10% aqueous solution of sulfuric acid for activation, washing with water, strike nickel plating with a bath predominantly containing nickel sulfate, washing with water and then immersion in 0.1% aqueous solution of chromic acid and causing the formation of oxidation film over the nickel plated surface.

Subsequently a 0.2-mm-thick metal layer is formed on the surface of the master mold by electroforming with use of a nickel sulfamate plating bath. A 1-mm-thick heat insulating layer is then formed on the metal layer by applying a composition of epoxy resin, hardener or curing agent, silica powder and glass fibers and curing the coating. And then usual electroless plating process is used to form a conductive film thereon. A nickel layer is then formed on the heat insulating layer by electroforming with use of a nickel sulfamate plating bath, to a thickness of 5 mm to obtain the desired strength. The nickel layer is finished by machining to the specified dimensions and shape to form a desired backing layer. The element thus obtained according to this invention is placed into a mold of injection molding and is used for molding ABS resin by injection molding machine. The molded articles obtained are superior in appearance and quality to those produced by conventional molds.

EXAMPLE 2

A master mold, thin metal layer and heat insulating layer are formed in the same manner as in Example 1. A backing layer is formed on the heat insulating layer by metal spraying with use of nickel. The element obtained achieves good results as in Example 1.

EXAMPLE 3

A master mold, thin metal layer and heat insulating layer are formed in the same manner as in Example 1. A backing layer is thereafter formed by metal casting with use of a type alloy of low melting point predominantly comprising lead, antimony and tin. The element obtained achieves good results as in Example 1.

EXAMPLE 4

Figure 2:
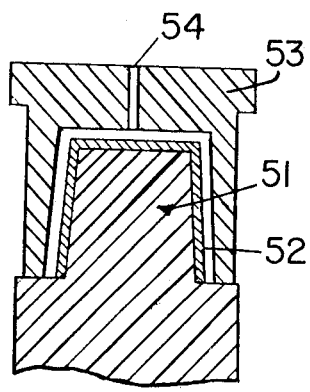
FIG. 2 is a diagram illustrating a mode of practicing the method of this invention.

With reference to FIG. 2, a master mold 51 and a thin metal layer 52 are formed in the same manner as in Example 1. Separately, a backing member 53 is formed from steel by machining. The backing member is fittable to the metal layer 52 with a uniform clearance of 1 mm provided between the layer 52 and the member 53. A flowable thermosetting resin composition having good adhering properties is filled into the clearance between the metal layer and the backing member 53 fitted thereto. The composition is charged through a bore 54 in the backing member 53 in the same manner as in transfer molding operation. The element obtained is found comparable to the element made in Example 1.

EXAMPLE 5

Figure 3:
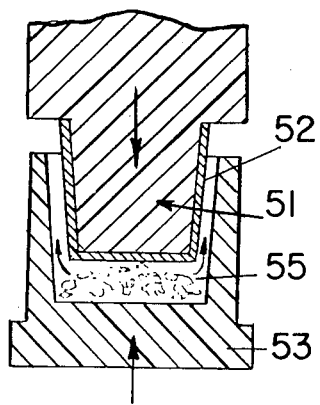
FIG. 3 is a diagram illustrating another mode of practicing the method of this invention.

With reference to FIG. 3, a master mold 51 and a thin metal layer 52 are formed in the same manner as in Example 1. Separately, a backing member 53 is made in the same manner as in Example 4. A highly adhesive thermosetting resin composition 55 which is uniformly spreadable throughout the clearance with application of heat and pressure is placed into the backing member 53. While holding the backing member 53 and the metal layer 52 in fitting engagement with each other, the composition is cured with application of heat and pressure through the member and layer to form a heat insulating layer. The element obtained, when used, achieves good results.

EXAMPLE 6

Figure 4:
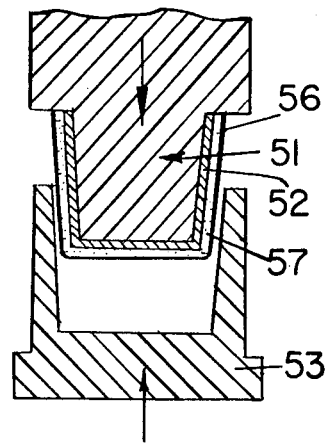
FIG. 4 is a diagram illustrating still another mode of practicing the method of this invention.

With reference to FIG. 4, a master mold 51 and a thin metal layer 52 are formed in the same manner as in Example 1. The metal layer is coated with a heat insulating material 56 in the same manner as in Example 1, while the same backing memeber 53 as formed in Example 4 is separately made. The backing member is adhered to the heat insulating layer with an epoxy resin adhesive 57. The element obtained has high accuracy and is comparable to the element of Example 1.

EXAMPLE 7

A master mold for a cavity element is made from gypsum in conformity with the shape of the desired portion of the article to be molded. A 0.5-mm-thick metal layer is formed on the surface of the master mold from zinc alloy by metal spraying. The foregoing layer is finished by machining. A composition comprising a curing agent, 100 parts by weight of epoxy resin and 150 parts by weight of silica powder is applied to the metal layer to a thickness of about 3 mm. After the coating, namely heat insulating material, has been cured, the insulating layer is machined to the specified dimensions and shape for finishing. A backing member separately prepared in the same manner as in Example 4 is adhered to the finished insulating layer with an epoxy adhesive. The resulting element, when used for molding ABS resin, give satisfactory products.

Needless to say, core elements for injection molding and divided mold elements for blow molding can be made by the same procedures as those followed for making the injection molding cavity elements described so far.

What we claim is:

1. A method of making an insulated metal mold comprising a molding surface defining the cavity of a mold for high pressure injection molding thermoplastic resin and having a metal layer providing the molding surface, a metal backing member, and a layer of heat-insulating means sandwiched between the metal layer and the backing member, wherein the method comprising the steps of:

(1) preparing a master mold conforming to the shape of a specified portion of the article to be molded, (2) forming a thin metal layer over the master mold in conformity with the shape of the master mold; said metal layer having a thickness of approximately 0.001 mm to 3 mm so that the injected molten thermoplastic resin rapidly heats the metal layer to a temperature sufficient to prevent a solid layer from being formed by the injected molten thermoplastic resin on the cavity surface, (3) forming a layer of heat-insulating means over the thin metal layer; said heat-insulating means comprising a thermosetting resin composition and controlling heat transmission from the metal layer to the backing member so that when the metal layer is heated to a selected temperature, the selected temperature is first maintained for a sufficient period of time to prevent a solid layer from being formed on the cavity surface by the injected molten resin during injection of the molten thermoplastic resin into the cavity, after which the metal layer cools to a temperature sufficiently to solidify the molten thermoplastic resin within a predetermined time after filling the mold cavity therewith, and said heat-insulating means also comprising at least one member selected from the group consisting of inorganic filler, metal powder filler, and fibrous filler; the inorganic filler consisting of a powder of at least one material selected from the group consisting of glass, silica, calcium carbonate, talc, clay and alumina, the metal powder filler consisting of a powder of at least one metal selected from the group consisting of aluminum, aluminum alloy, copper and copper alloy; and the fibrous filler consisting of at least one material selected from the group consisting of glass fiber, carbon fiber, asbestos fiber and whisker, (4) forming a backing member over the heat-insulating layer, and (5) removing the master mold from the thin metal layer after forming the backing member.

2. A method as defined in claim 1 wherein the backing layer is formed by electroforming.

3. A method as defined in claim 1 wherein the backing layer is formed by metal spraying.

4. A method as defined in claim 1 wherein the backing layer is formed by metal casting.

5. A method as defined in claim 1 wherein the thin metal layer is formed by electroforming.

6. A method as defined in claim 1 wherein the thin metal layer is formed by metal spraying.

7. A method as defined in claim 1 wherein the thin metal layer is formed by electroless plating.

8. A method according to claim 1, wherein the thickness of the thin metal layer is approximately 0.2 mm to 0.5 mm.

9. A method of making an insulated metal mold comprising a molding surface defining the cavity of a mold for high pressure injection molding thermoplastic resin and having a metal layer providing the molding surface, a metal backing member, and a layer of heat-insulating means sandwiched between the metal layer and the backing member, wherein the method comprising the steps of:

(1) preparing a master mold conforming to the shape of a specified portion of the article to be molded, (2) forming a thin metal layer over the master mold in conformity with the shape of the master mold; said metal layer having a thickness of approximately 0.001 mm to 3 mm so that the injected molten thermoplastic resin rapidly heats the metal layer to a temperature sufficient to prevent a solid layer from being formed by the injected molten thermoplastic resin on the cavity surface, (3) preparing a backing member fittable to the thin metal layer with a specified clearance provided therebetween, (4) forming a layer of heat-insulating means in the clearance between the metal layer and the backing member fitted to the metal layer and joining the backing member to the metal layer with the heat-insulating layer at the same time; said heat-insulating means comprising a thermosetting resin composition and controlling heat transmission from the metal layer to the backing member so that when the metal layer is heated to a selected temperature, the selected temperature is first maintained for a sufficient period of time to prevent a solid layer from being formed on the cavity surface by the injected molten resin during injection of the molten thermoplastic resin into the cavity, after which the metal layer cools to a temperature sufficiently to solidify the molten thermoplastic resin within a predetermined time after filling the mold cavity therewith, and said heat-insulating means also comprising at least one member selected from the group consisting of inorganic filler, metal powder filler, and fibrous filler; the inorganic filler consisting of a powder of at least one material selected from the group consisting of glass, silica, calcium carbonate, talc, clay and alumina, the metal powder filler consisting of a powder of at least one metal selected from the group consisting of aluminum, aluminum alloy, copper and copper alloy; and the fibrous filler consisting of at least one material selected from the group consisting of glass fiber, carbon fiber, asbestos fiber and whisker, and (5) removing the master mold from the thin metal layer after joining the backing member to the metal layer.

10. A method as defined in claim 9 wherein the heat insulating layer is formed between the metal layer and the backing member by filling the heat insulating material in a flowable state into the clearance between the metal layer and the backing member fitted to the metal layer.

11. A method as defined in claim 9 wherein the heat insulating material is curable with application of heat and pressure as spread uniformly throughout the clearance, and the heat insulating layer is formed between the metal layer and the backing member by placing the heat insulating material into the clearance and heating the heat insulating material through the metal layer and the backing member with application of pressure.

12. A method as defined in claim 9 wherein the heat insulating layer is formed between the metal layer and the backing member by covering the metal layer with the heat insulating material and thereafter joining the heat insulating material to the backing member with an adhesive.

13. A method as defined in claim 12 wherein the adhesive is an epoxy resin adhesive.

14. A method as defined in any one of claims 9–11 wherein the thin metal layer is formed by electroforming.

15. A method as defined in any one of claims 9–11 wherein the thin metal layer is formed by metal spraying.

16. A method as defined in any one of claims 9–11 wherein the thin metal layer is formed by electroless plating.

17. A method according to claim 9, wherein the thickness of the thin metal layer is approximately 0.2 mm to 0.5 mm.

* * * * *

UNITED STATES PATENT AND TRADEMARK OFFICE
CERTIFICATE OF CORRECTION

PATENT NO. : 4,285,901
DATED : August 25, 1981
INVENTOR(S) : Akira Yotsutsuji et al.

It is certified that error appears in the above—identified patent and that said Letters Patent is hereby corrected as shown below:

On the cover sheet Insert

--(73) Assignee: Osaka City and Taiyo Manufacturing
Works Co., Ltd. Osaka-shi, Japan --.

Signed and Sealed this

Fifth Day of January 1982

[SEAL]

Attest:

GERALD J. MOSSINGHOFF

*Attesting Officer*     *Commissioner of Patents and Trademarks*